(12) United States Patent
Oshima (10) Patent No.: US 7,698,497 B2
(45) Date of Patent: Apr. 13, 2010

(54) METHOD OF CONTROLLING CARD-SHAPED MEMORY DEVICE

(75) Inventor: Takashi Oshima, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 508 days.

(21) Appl. No.: 11/626,589

(22) Filed: Jan. 24, 2007

(65) Prior Publication Data

US 2007/0174578 A1 Jul. 26, 2007

(30) Foreign Application Priority Data

Jan. 25, 2006 (JP) .............................. 2006-016135

(51) Int. Cl.
*G06F 12/00* (2006.01)

(52) U.S. Cl. ................... 711/103; 365/185.33

(58) Field of Classification Search .................. 711/103; 365/185.33
See application file for complete search history.

(56) References Cited

U.S. PATENT DOCUMENTS

| | | | | |
|---|---|---|---|---|
| 5,586,285 A | * | 12/1996 | Hasbun et al. | 711/103 |
| 6,014,724 A | * | 1/2000 | Jenett | 711/103 |
| 6,836,817 B2 | * | 12/2004 | Wang | 711/103 |
| 6,839,823 B1 | * | 1/2005 | See et al. | 711/171 |
| 6,901,498 B2 | | 5/2005 | Conley | |
| 2004/0111553 A1 | * | 6/2004 | Conley | 711/103 |
| 2007/0086472 A1 | * | 4/2007 | Shankara | 370/428 |

FOREIGN PATENT DOCUMENTS

JP 2003-15947 * 1/2003

* cited by examiner

*Primary Examiner*—Christian P Chace
*Assistant Examiner*—Hashem Farrokh
(74) *Attorney, Agent, or Firm*—Oblon, Spivak, McClelland, Maier & Neustadt, L.L.P.

(57) ABSTRACT

Each of a plurality of memory areas includes a plurality of blocks. Each of the blocks includes a plurality of pages. Each of the memory areas also includes a data cache and a page buffer. A control unit controls a lower-limit value of the number of empty blocks in each of the plurality of memory areas.

16 Claims, 9 Drawing Sheets

METHOD OF CONTROLLING CARD-SHAPED MEMORY DEVICE

CROSS-REFERENCE TO RELATED APPLICATIONS

This application is based upon and claims the benefit of priority from prior Japanese Patent Application No. 2006-016135, filed Jan. 25, 2006, the entire contents of which are incorporated herein by reference.

BACKGROUND OF THE INVENTION

1. Field of the Invention

The present invention relates to a method of controlling a semiconductor memory device, for example, a NAND-type flash memory which is applied to a memory card.

2. Description of the Related Art

Recently, a NAND-type flash memory is composed of, for example, a plurality of planes in order to enable high-speed access. Each plane is composed of a memory area which is a memory cell array of a set of a plurality of blocks each including a plurality of pages, a data cache for transmitting/receiving data to/from outside, and a page buffer for receiving and holding data from the data cache. The page is an access unit at a data write/read time, and the block is a data erase unit.

Each plane uses two buffers, that is, the data cache and the page buffer. Thereby, the NAND-type flash memory is enabled to execute a write operation while the controller of the memory card is reading out data from the data cache.

In the meantime, the NAND-type flash memory can erase data only on a block-by-block basis. Even in the case of rewriting data in only one page, it is necessary to erase a block comprising a plurality of pages. In the block that is to be erased, the other pages which are not rewritten need to be copied to another block. The copy of the page is executed in the following manner.

To begin with, data of one page is read out from the NAND-type flash memory into the page buffer. The data in the page buffer is transferred to the data cache, and the transferred data is read out from the data cache to the controller. The read-out data is subjected to, e.g. error correction by the controller. Thereafter, the controller designates a page which is the destination of copy, and delivers the error-corrected data to the data cache in the NAND-type flash memory. The data in the data cache is transferred to the page buffer, and the data in the page buffer is written in the designated page that is the destination of copy.

In this case, in order to realize high-speed data rewrite, it is necessary to increase the speed of the copy operation. In the case where a plurality of copy operations are to be executed, data read-out and data write are repeated in succession. In the NAND-type flash memory, while the controller of the memory card is reading out data from the data cache or while the controller is writing data in the data cache, data can be written from the page buffer into the memory cell. This function of writing data from the page buffer into the memory cell while data is being transferred between the controller and the data cache is referred to as "cache function". The cache function can increase the speed of the copy operation, compared to the ordinary write operation in which data transfer between the controller and the data cache and data write from the page buffer into the memory cell are separately executed.

This cache function, however, cannot be used unless a block which is the source of copy and a block which is the destination of copy are present within the same plane. For example, if there are many blocks with defects (referred to as "defective blocks") in a specific plane and there is no empty block, which is a destination of copy, in the plane, it would become impossible to assign a block of the destination of copy in the plane. In such a case, the cache function cannot be used, and the speed of the copy operation decreases. Consequently, there arises a problem that the write speed decreases. Under the circumstances, there has been a demand for a method of controlling a semiconductor memory device, which can avoid the absence of an empty block which is a destination of copy in a specific plane, and can prevent a decrease in write speed.

As related art, the following technique has been developed. For example, a plurality of physical blocks in a NAND-type flash memory are classified into a plurality of groups. If the number of defective blocks in each group is less than a predetermined value, a plurality of blocks which belong to different groups are virtually combined into a virtual block (see, e.g. Jpn. Pat. Appln. KOKAI Publication No. 2003-15947).

BRIEF SUMMARY OF THE INVENTION

According to a first aspect of the present invention, there is provided a method of controlling a semiconductor memory device, comprising: a plurality of memory areas each including a plurality of blocks, each of which includes a plurality of pages, and including a data cache and a page buffer; and causing a control unit to control a lower-limit value of a number of empty blocks in each of the plurality of memory areas.

According to a second aspect of the present invention, there is provided a method of controlling a semiconductor memory device, comprising: a plurality of memory areas each including a plurality of blocks, each of which includes a plurality of pages; a data cache and a page buffer, which are disposed in association with each of the plurality of memory areas; and causing a control unit to select the memory area with a greatest number of empty blocks when data is to be newly written in one of the plurality of memory areas, and to write data in a block in the selected memory area.

According to a third aspect of the present invention, there is provided a semiconductor memory device comprising: a plurality of memory areas each including a plurality of blocks, each of which includes a plurality of pages, and including a data cache and a page buffer; and a control unit which controls a lower-limit value of a number of empty blocks in each of the plurality of memory areas.

DETAILED DESCRIPTION OF THE INVENTION

First Embodiment

Figure 2:
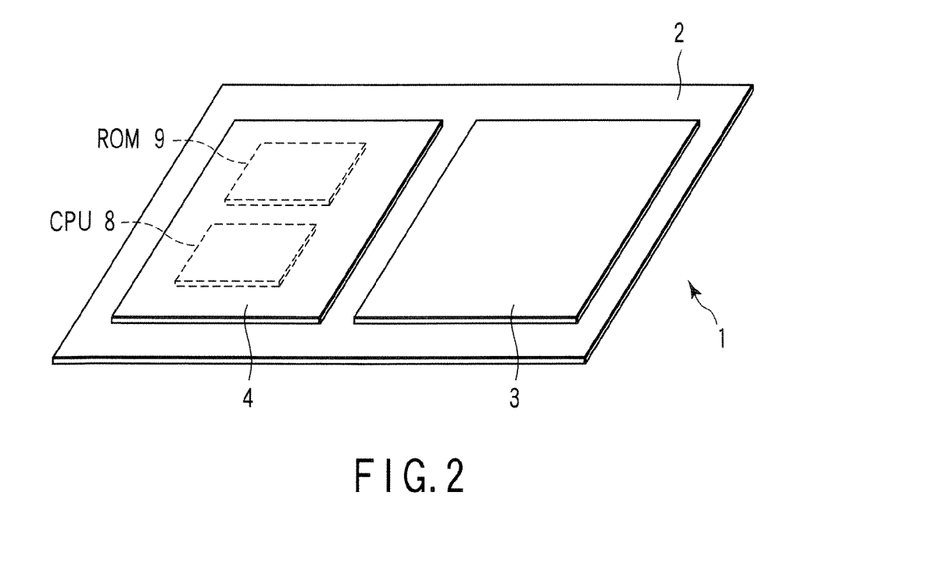
FIG. 2 is a perspective view of an example of a memory card to which the present embodiment is applied.

FIG. 2 is a perspective view that schematically shows the structure of devices which are mounted on a memory card according to a first embodiment of the invention.

A memory card 1 comprises a printed circuit board (PCB) 2, and a NAND-type flash memory 3 and a controller 4 which are disposed on the PCB 2. The controller 4 includes functional blocks such as a central processing unit (CPU) 8 and a read-only memory (ROM) 9. The NAND-type flash memory 3 may be a 2-value memory which stores 1-bit information in one memory cell, or a multi-value memory which stores information greater than 1 bit (e.g. 2 bits) in one memory cell. FIG. 2 shows the case in which the NAND-type flash memory 3 and controller 4 are disposed on the PCB 2 of the memory card. However, the NAND-type flash memory 3 and controller 4 may be disposed on the same large-scale integration (LSI) substrate.

Figure 3:
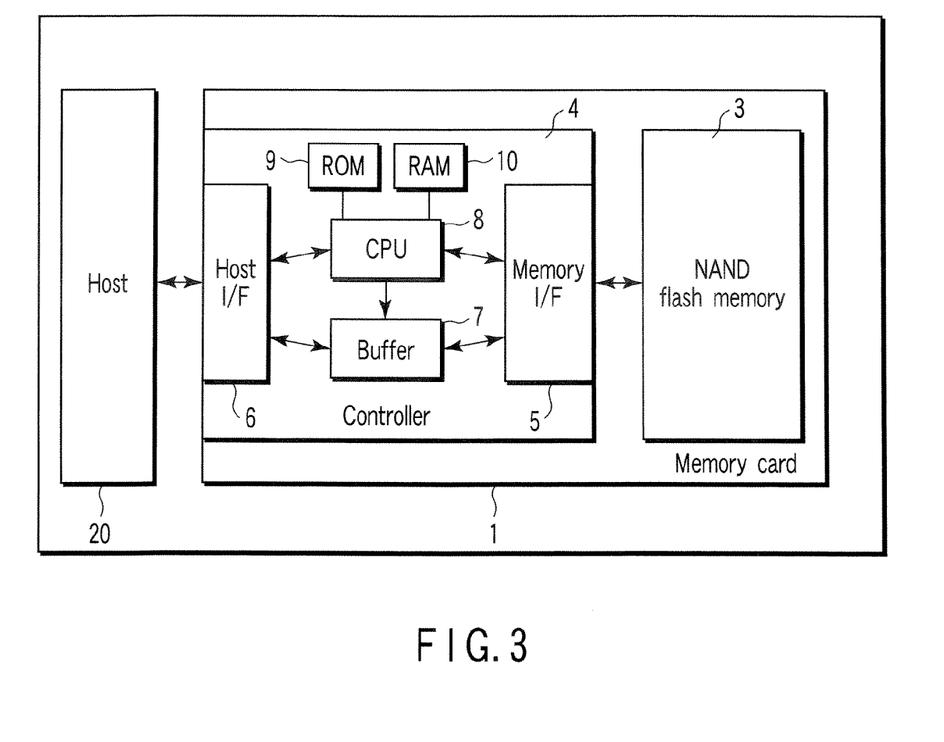
FIG. 3 is a block diagram showing a structure including a host and the memory card shown in FIG. 2.

FIG. 3 is a block diagram showing a structure including a host device and the above-described memory card. In FIG. 3, the parts common to those shown in FIG. 2 are denoted by like reference numerals.

The host device (hereinafter referred to as "host") 20 includes hardware and software (system) for accessing the connected memory card.

The memory card 1 receives power from the host 20 when it is connected to the host 20, and operates to execute a process corresponding to access from the host 20. The memory card 1, as described above, includes the NAND-type flash memory 3 and controller 4.

The NAND-type flash memory 3 is a nonvolatile memory in which a block size at an erase time (erase block size) is set at, e.g. 256 kBytes. The NAND-type flash memory 3 is fabricated by using, e.g. 0.09 µm process technology. Specifically, the design rule of the NAND-type flash memory 3 is less than 0.1 µm.

The controller 4 includes, in addition to the above-described CPU 8 and ROM 9, a memory interface unit 5, a host interface unit 6, a buffer 7, and a random access memory (RAM) 10.

The memory interface unit 5 executes an interface process between the controller 4 and the NAND-type flash memory 3. The host interface unit 6 executes an interface process between the controller 4 and the host 20.

The buffer 7 temporarily stores a predetermined amount of data (e.g. 1-page data) when data which is sent from the host is to be written in the NAND-type flash memory 3, and also temporarily stores a predetermined amount data when data which is read out of the NAND-type flash memory 3 is to be sent to the host 20.

The CPU 8 executes an overall control of the operation of the memory card 1. For example, when the memory card 1 is supplied with power, the CPU 8 loads firmware (control program), which is stored in the ROM 9, into the RAM 10, and executes a predetermined process. Specifically, the CPU 8 creates various tables in the RAM 10, receives a write command, a read command or an erase command from the host 20 and accesses an associated area in the NAND-type flash memory 3, and controls a data transfer process through the buffer 7.

The ROM 9 is a memory that stores, e.g. a control program which is used by the CPU 8. The RAM 10 is a volatile memory which is used as a working area of the CPU 8 and stores the control program and various tables.

Figure 4:
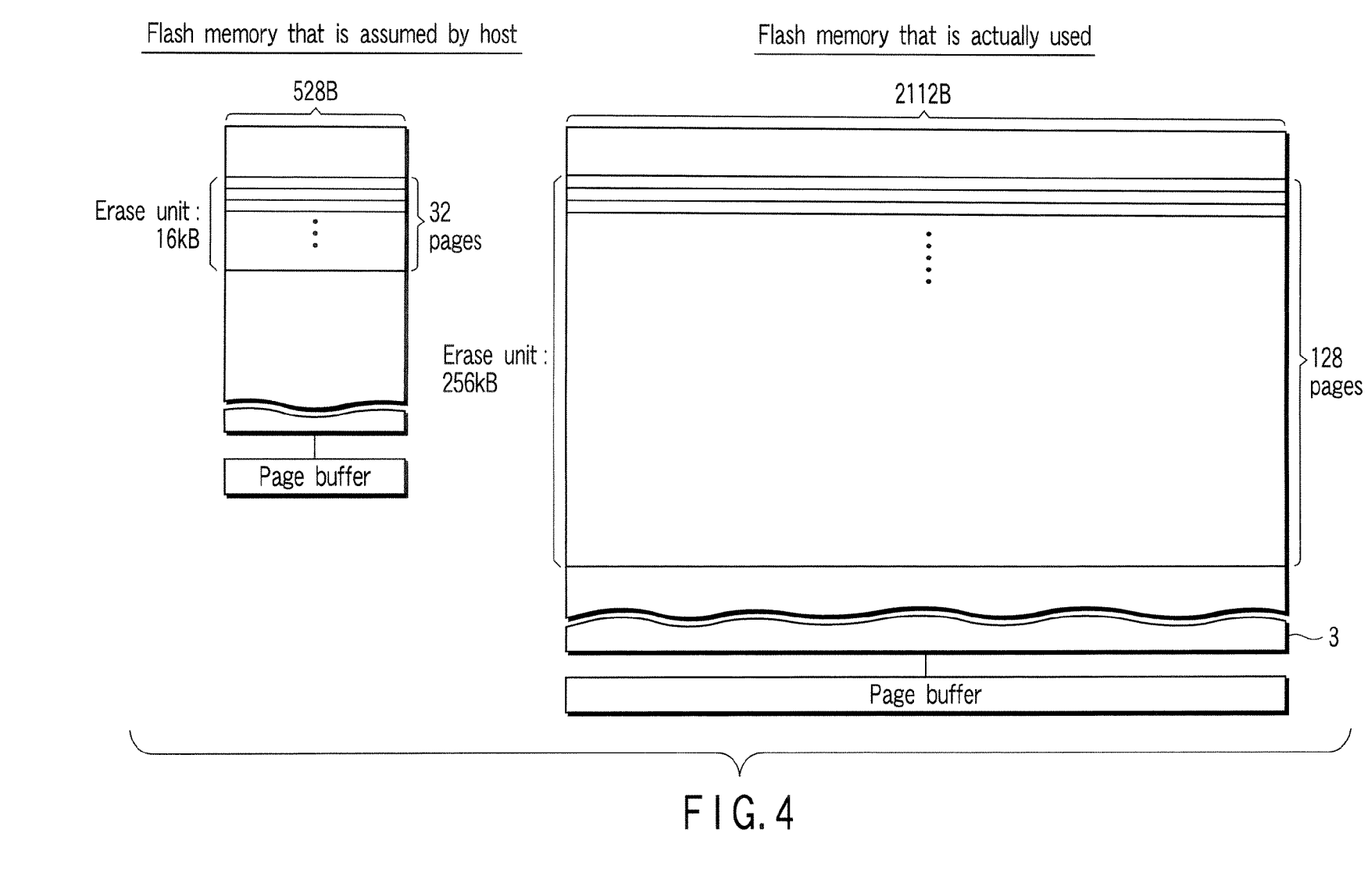
FIG. 4 shows a relationship between a flash memory which is assumed by the host, and a flash memory which is actually used.

FIG. 4 shows a difference in data arrangement between a flash memory which is assumed by the host 20 and an actually used flash memory (i.e. NAND-type flash memory 3 in the memory card 1).

In the flash memory that is assumed by the host 20, each page has 528 Bytes (512-Byte data memory area+16-Byte redundant area). 32 pages are one erase unit (i.e. 16 kBytes+ 0.5 kByte (k=1024)). In the description below, a card including this flash memory is also referred to as "small-block card".

On the other hand, in the actually used flash memory 3, each page has 2112 Bytes (e.g. 512-Byte data memory area× 4+10-Byte redundant area×4+24-Byte management data memory area), and 128 pages are one erase unit (i.e. 256 kBytes+8 kBytes). In the description below, a card including this flash memory is also referred to as "large-block card". In addition, in the description below, the erase unit of the small-block card is referred to as 16 kBytes, and the erase unit of the large-block card is referred to as 256 kBytes.

Each of the flash memory that is assumed by the host 20 and the flash memory 3 that is actually used includes a page buffer for inputting/outputting data to/from the flash memory. The storage capacity of the page buffer, which is included in the flash memory that is assumed by the host 20, is 528 Bytes (512 Bytes+16 Bytes). On the other hand, the storage capacity of the page buffer, which is actually used, is 2112 Bytes (2048 Bytes+64 Bytes). At the time of, e.g. data write, each page buffer executes a data input/output process for the flash memory in units of one page corresponding to its own storage capacity.

FIG. 4 shows the case in which the erase block size of the actually used flash memory 3 is 16 times greater than the erase block size of the flash memory that is assumed by the host 20. However, the present embodiment is not limited to this example, and the erase block size of the actually used flash memory 3 may be set at another magnification, if it is substantially an integer number of times of the erase block size of the flash memory that is assumed by the host 20.

In order to fabricate a practically effective large-block card, it is preferable that the storage capacity of the flash memory 3 shown in FIG. 4 be 1 G bits or more. If the storage capacity of the flash memory is, e.g. 1 G bits, the number of 256-kByte blocks (erase units) is 512.

In addition, FIG. 4 shows, by way of example, the case in which the erase unit is the 256-kByte block. It is practically effective to adopt such a structure that the erase unit is, e.g. a 128-kByte block. In this case, the number of 128-kByte blocks is 1024.

In the example shown in FIG. 4, the erase block size of the actually used flash memory 3 is greater than the erase block size of the flash memory that is assumed by the host 20. However, the present embodiment is not limited to this example, and the erase block size of the actually used flash memory 3 may be designed to be smaller than the erase block size of the flash memory that is assumed by the host 20.

Figure 5:
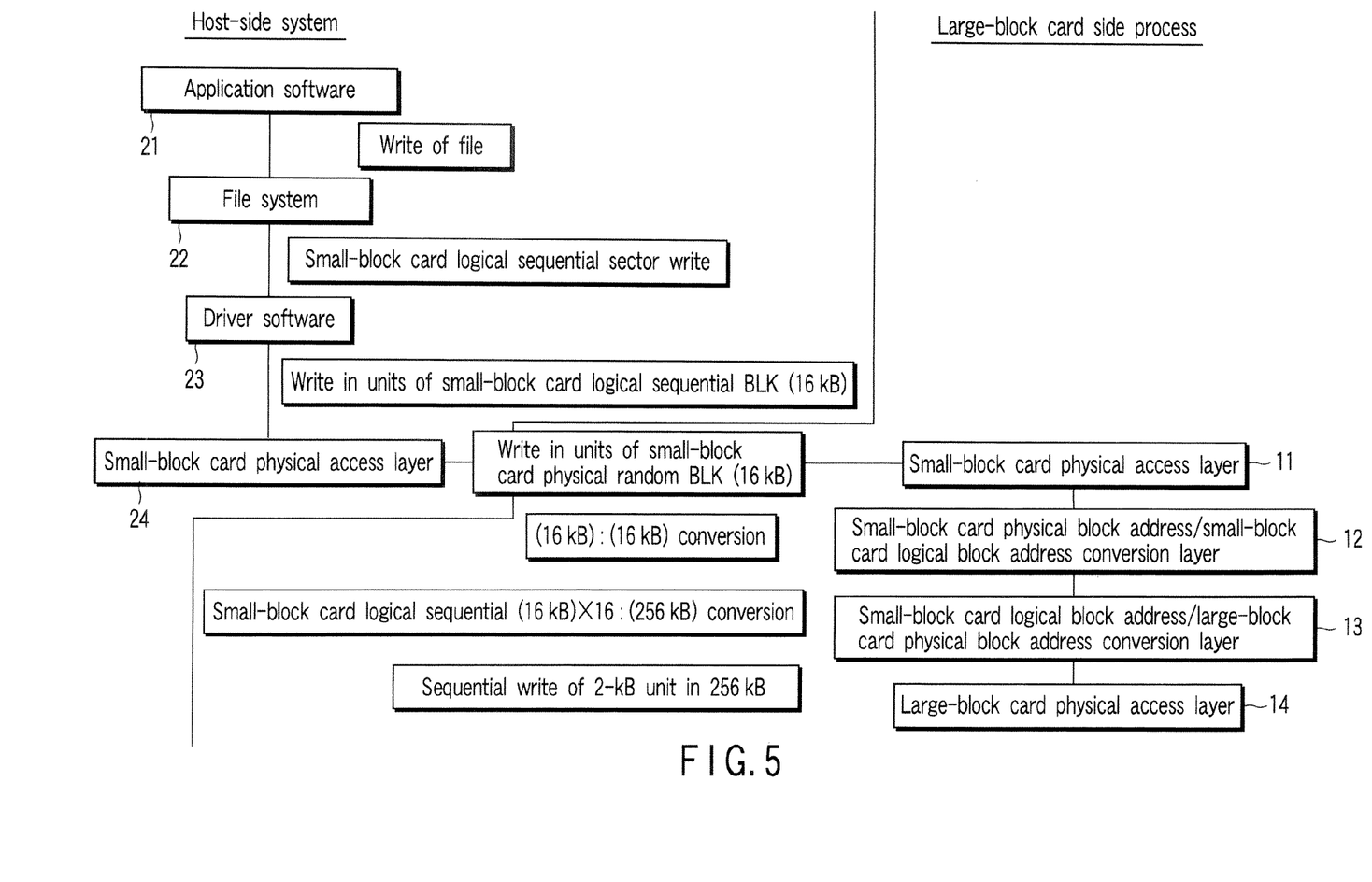
FIG. 5 shows communication layers of the host-side system and memory card.

FIG. 5 shows communication layers of the host 20 side system and memory card 1 (large-block card).

The host 20 side system includes application software 21, a file system 22, driver software 23 and a small-block card physical access layer 24. On the other hand, the memory card 1 (large-block card) includes a small-block card physical access layer 11, a small-block card physical block address/small-block card logical block address conversion layer 12, a small-block card logical block address/large-block physical block address conversion layer 13, and a large-block card physical access layer 14.

For example, if the application software 21 of the host 20 system sends a file write request to the file system 22, the file system 22 instructs the driver software 23 to execute sequential sector write on the basis of logical block addresses of the small-block card. Upon receiving the instruction, the driver software 23 realizes sequential write in units of a 16-kByte block on the basis of the logical block addresses of the small-block card. In this case, the driver software 23 executes logical/physical block conversion, and issues to the large-block card a random write command, which is based on the physical block address of the small-block card, through the small-block card physical access layer 24, thus executing data transfer.

In the write access, in the case of either the small-block card or large-block card, it is presupposed, for the reason of protocols, that information transmission/reception is executed in the order of (1) command, (2) page address (row address), (3) column address, (4) data and (5) program confirmation command. In the host, logical/physical block conversion may not be executed, and the memory card may be accessed by the logical address.

If the small-block card physical access layer 11 in the large-block card receives a write command, which is based on the physical block address of the small-block card, from the host 20, the small-block card physical access layer 11 acquires not only the physical block address and data, but also the logical block address included in the data accompanying the physical block address and data.

The small-block card physical block address/small-block card logical block address conversion layer 12 includes a first table for executing, at the time of, e.g. data read-out, a conversion process from the physical block address of the small-block card (corresponding to the 16-kByte block) to the logical block address of the small-block card (corresponding to the 16-kByte block). When the small-block card physical access layer 11 receives the write command and acquires the logical block address of the small-block card, the conversion layer 12 reflects the logical block address of the small-block card on the first table. The conversion layer 12 also reflects the physical block address on the first table.

The small-block card logical block address/large-block card physical block address conversion layer 13 includes a second table for executing, at the time of, e.g. data read-out, a conversion process from the logical block address of the small-block card (corresponding to the sequential 16-kByte block×16) to the physical block address of the large-block card (corresponding to the 256-kByte physical block). When the small-block card physical access layer 11 receives the write command and acquires the logical block address of the small-block card, the conversion layer 12 reflects the logical block address of the small-block card on the second table.

The large-block card physical access layer 14 determines the data arrangement in the flash memory 3 on the basis of the logical block address of the small-block card, which the small-block card physical access layer 11 has acquired upon receiving the write command. The large-block card physical access layer 14 then sequentially writes the 16-kByte data in units of 2 kBytes (1 page) in the 256-kByte physical block. In addition, the large-block card physical access layer 14 stores the acquired logical address and physical block address of the small-block card in a predetermined area in the management data area in the flash memory 3.

As has been described above, the host 20 issues the command based on the physical block address of the small-block card. Thus, the large-block card side executes such management as to understand which of the 256-kByte physical blocks includes the data corresponding to the physical block address of the small-block card. Specifically, the host 20 manages the correspondence of the logical/physical block addresses of the small-block card for each 16-kByte block, and executes such management as to understand which of 256-kByte physical blocks in the large-block card stores the data corresponding to the logical block addresses of consecutive 256-kByte blocks in the small-block card.

Figure 6A:
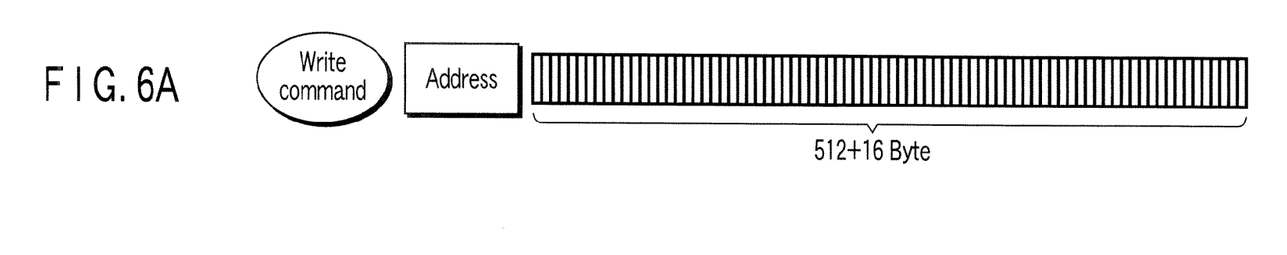
FIG. 6A and FIG. 6B show a format of a command which is sent from the host side.
Figure 6B:
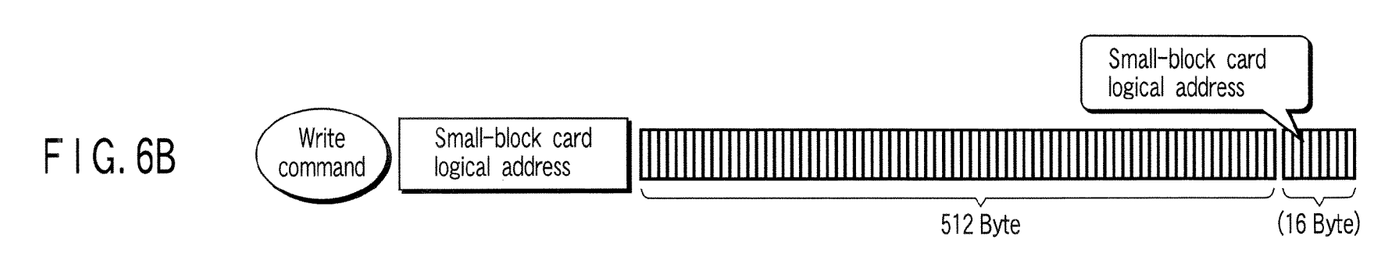

FIG. 6A and FIG. 6B show a format of a command which is sent from the host 20 side. As shown in FIG. 6A, the packet of the command, which is sent from the host 20, includes various information such as kind-of-command information ("write" in this case), an address (physical block address) and data (substantial data such as content and accompanying data (512 Bytes+16 Bytes)).

In the packet with this format, as shown in FIG. 6B, the "logical block address" of the small-block card (the logical address corresponding to the 16-kByte block to be accessed) is disposed at a predetermined position in the 16 Bytes of the accompanying data. The large-block card acquires this "logical block address", in addition to the kind-of-command information, physical block address and data. The "logical block address" is not added in the case of the read-out command.

Figure 7:
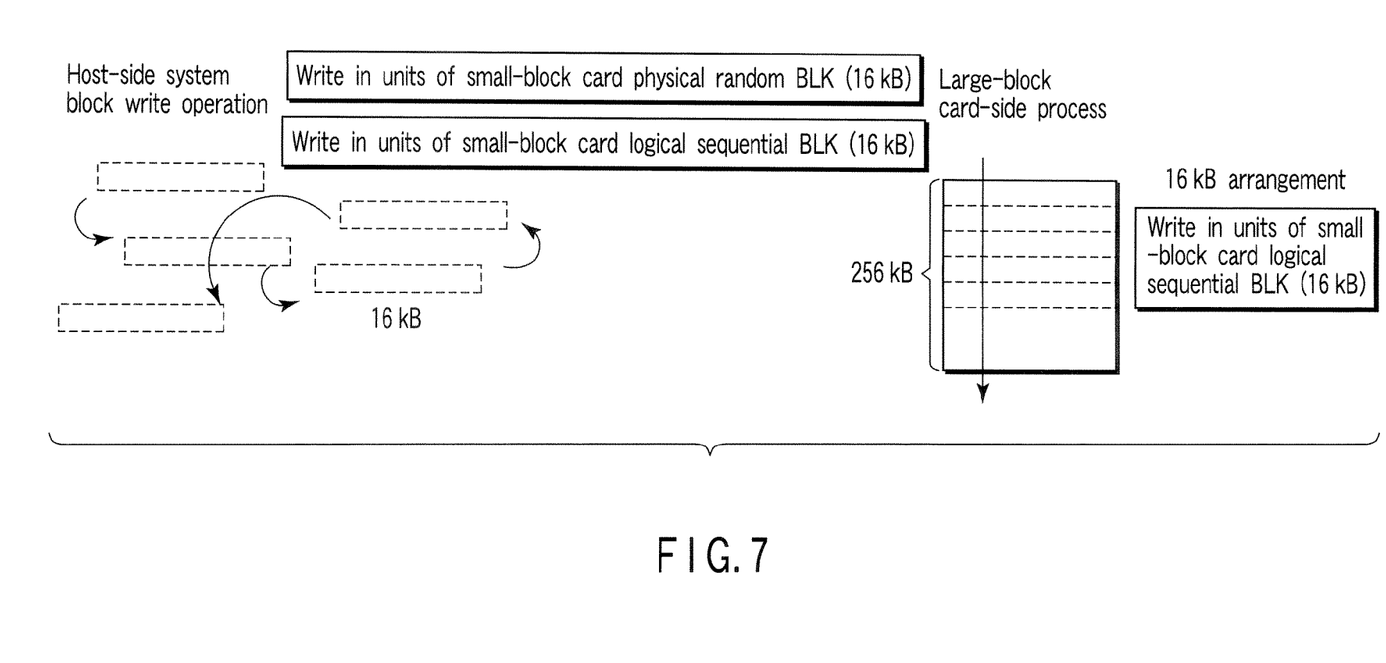
FIG. 7 shows, by comparison, a block write operation which is assumed by the host side, and a write process which is actually executed by the memory card side.

FIG. 7 shows, by comparison, a block write operation which is assumed by the host 20 side, and a write process which is actually executed by the memory card side (large-block card).

At the time of occurrence of a sequential write operation of the 16-kByte block unit on the basis of the logical address of the small-block card, the host 20 side (the left side in FIG. 7) executes a random write operation of the 16-kByte block unit on the basis of the physical block address of the small-block card.

On the other hand, upon receiving the write command from the host 20 side, the large-block card side (the right side in FIG. 7) sequentially writes in the NAND-type flash memory 3 the data of the 16-kByte block unit on the basis of the logical address of the small-block card.

The host 20 executes the random write operation of the 16-kByte unit on the basis of the physical address of the small block. In general, in the random write operation, a process for rewriting only a part of the large block (256 kBytes) frequently occurs. The NAND-type flash memory 3 can execute erase only on a block-by-block basis. Thus, when only a part of the block is to be rewritten, new data for rewrite is first written in a new block which has been erased. Then, non-rewritten data in the old block including old data to be rewritten is copied to the new block. This operation is repeated to rewrite a part of the block.

Figure 1:
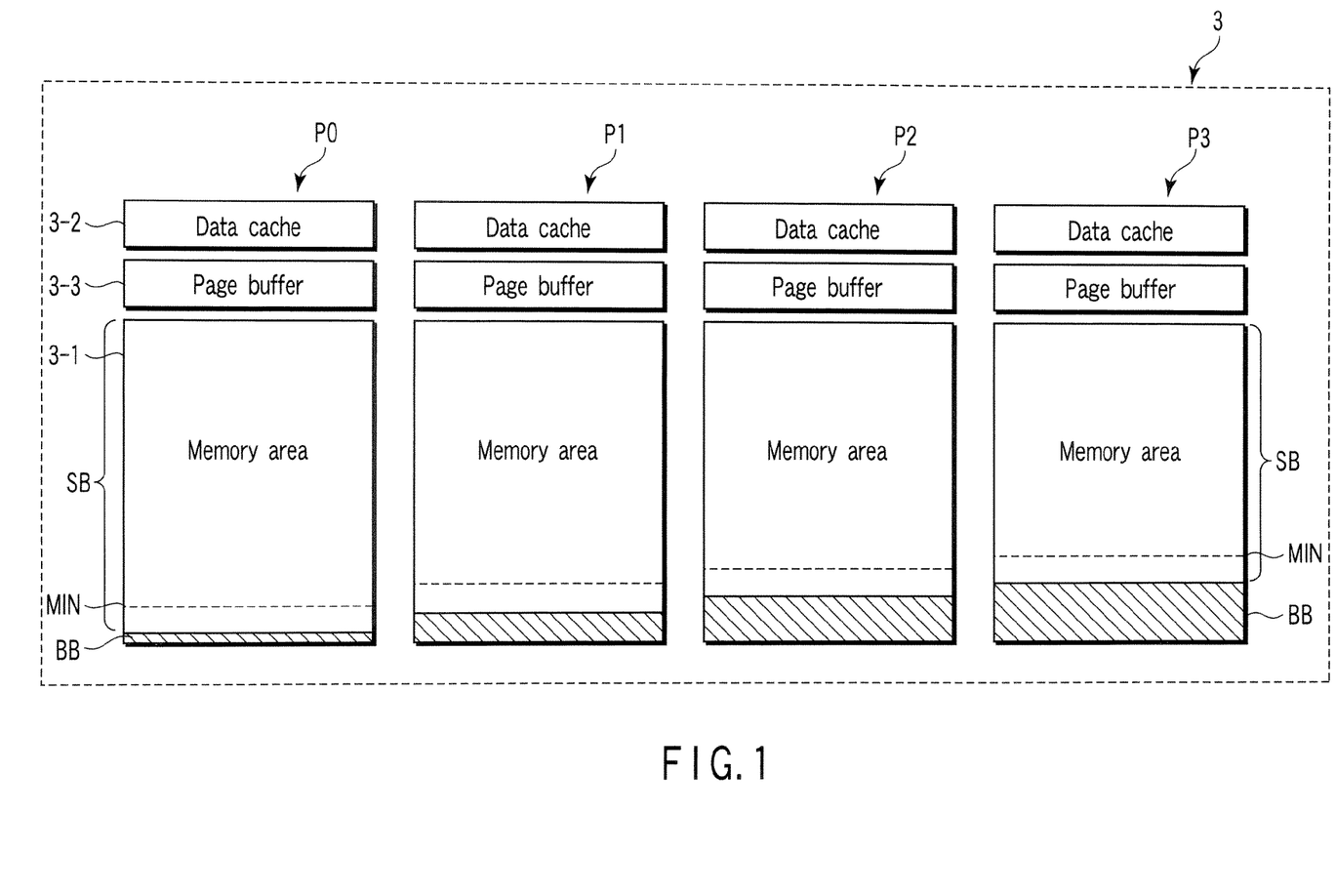
FIG. 1 relates to an embodiment of the present invention and shows an example of an empty block which is set in each of planes.

FIG. 1 schematically shows the NAND-type flash memory 3 according to the first embodiment of the invention. The NAND-type flash memory 3 includes, for example, a plurality of planes P0 to P3. Each plane includes, for example, a memory area 3-1 which is a memory cell array, a data cache 3-2 for transmitting/receiving data to/from outside, and a page buffer 3-3 which receives and holds data from the data cache. The memory area 3-1 includes a plurality of blocks (large blocks), and each block includes a plurality of pages (not shown). The general scheme of the write operation for the planes P0 to P3 are as has been described above. The characteristic operation of the present embodiment for the planes P0 to P3 will be described later.

Figure 8A:
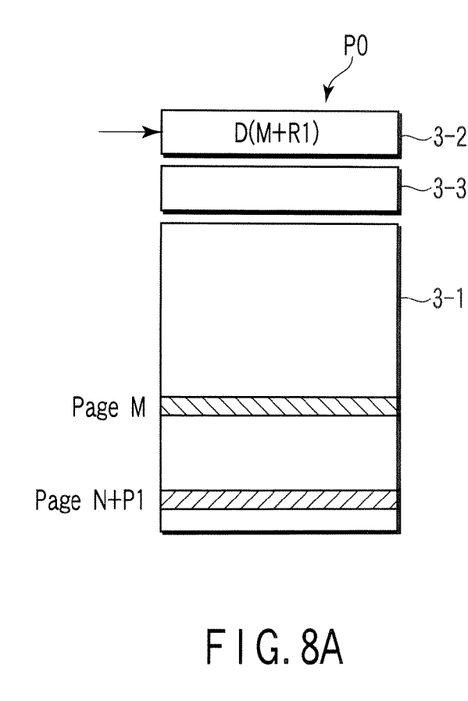
FIG. 8A, FIG. 8B and FIG. 8C show an example of a cache function.
Figure 8B:
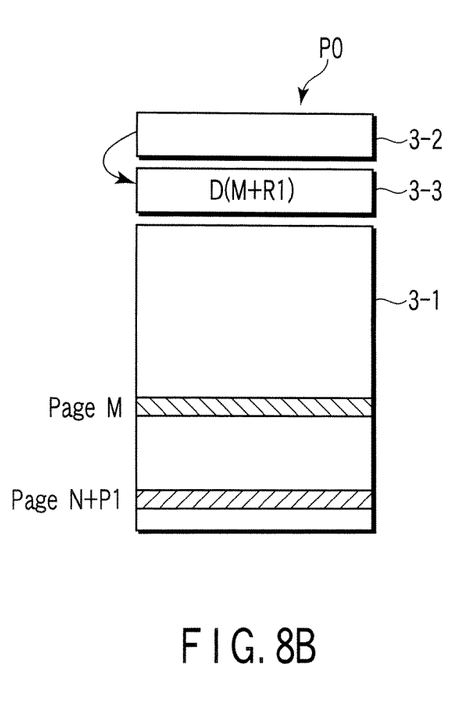
Figure 8C:
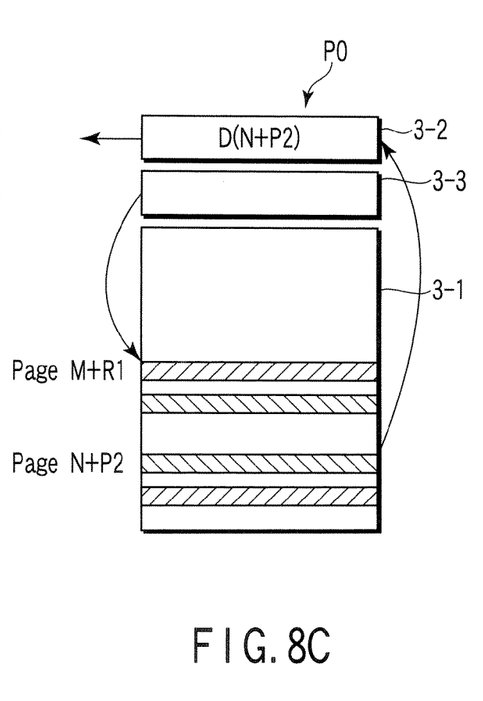

FIG. 8A to FIG. 8C show an example of the cache function using the plane P0. As shown in FIG. 8A, for example, when the controller 4 of the memory card 1 is writing data of a page (M+R1) in the data cache 3-2, data stored in the page buffer 3-3 is written in a page M. Subsequently, as shown in FIG. 8B, the NAND-type flash memory 3 moves the data of the page (M+R1), which is stored in the data cache 3-2, into the page buffer 3-3. Then, as shown in FIG. 8C, in response to a read-out request from the controller 4, the NAND-type flash memory 3 reads out, for example, the data of a page (N+P2) from the memory area 3-1 to the data cache 3-2. Thereafter, while the controller 4 is reading out the data of the (N+P2) which is stored in the data cache 3-2, the NAND-type flash memory 3 writes the data of the page (M+R1), which is stored in the page buffer 3-3, into the memory area 3-1. As described above, by using the cache function, the write operation of the NAND-type flash memory and the write operation or read-out operation of the controller can be executed in parallel.

In the first embodiment, in order to continuously execute the copy operation using the above-described cache function, the number of empty blocks in the plane is controlled as described below.

Assume now that the NAND-type flash memory 3 comprises four planes P0 to P3, as shown in FIG. 1, and each plane includes 1024 blocks and there are 4096 blocks in total. Also assume that in the memory card system that requires 4000 blocks as the data memory area, the numbers NBB of initial defective blocks BB in the planes P0 to P3 are 4, 14, 24, 34, respectively. In this case, the numbers NSB of initial empty blocks in empty block areas SB in the planes P0 to P3, in which no data is written, are as follows:

Plane P0: 1020 blocks
Plane P1: 1010 blocks
Plane P2: 1000 blocks
Plane P3: 990 blocks.

In the first embodiment, the lower-limit values MIN of the numbers NSB of empty blocks in the planes P0 to P3 are controlled, for example, to be equal. For example, in the respective planes P0 to P3, the lower-limit value MIN of the number NSB of empty blocks is managed to be, e.g. 10 blocks.

Figure 9:
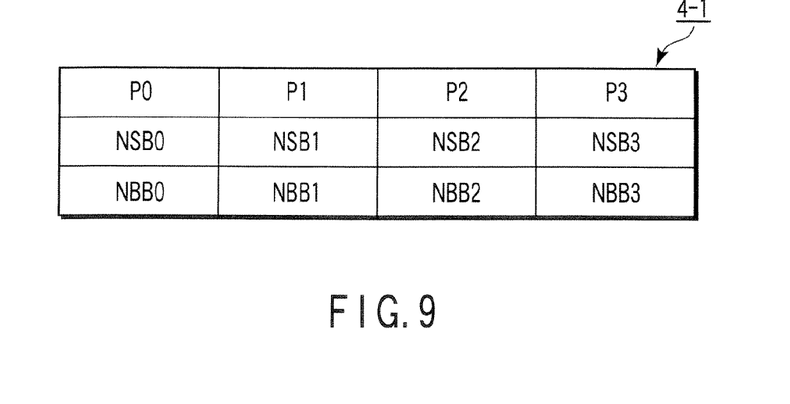
FIG. 9 shows an example of a management table which is managed by the controller.

FIG. 9 shows an example of a management table 4-1 which is managed by the controller 4. The management table 4-1 manages the numbers NSB0 to NSB3 of empty blocks and the numbers NBB0 to NBB3 of defective blocks BB in association with the planes P0 to P3. In the case of the first embodiment, in the initial state, the numbers NSB0 to NSB3 of empty blocks are "1020", "1010", "1000", and "990", respectively, and the numbers NBB0 to NBB3 of defective blocks BB are "4", "14", "24" and "34", respectively. Data write is executed in the order of plane P0, plane P1, plane P2 and plane P3. When data is newly written, a new block is assigned. To begin with, the controller 4 assigns a new block of the plane P0, and writes data in this new block. The controller 4 decrements "1" from the empty block number NSB0 in the management table 4-1. Each time a new block is assigned, the controller 4 decrements "1" from the empty block number NSB0 in the management table 4-1. If a defective block occurs later in the non-written area, this block is made nonusable. Thus, the empty block number NSB0 of the associated plane is decremented.

Figure 10:
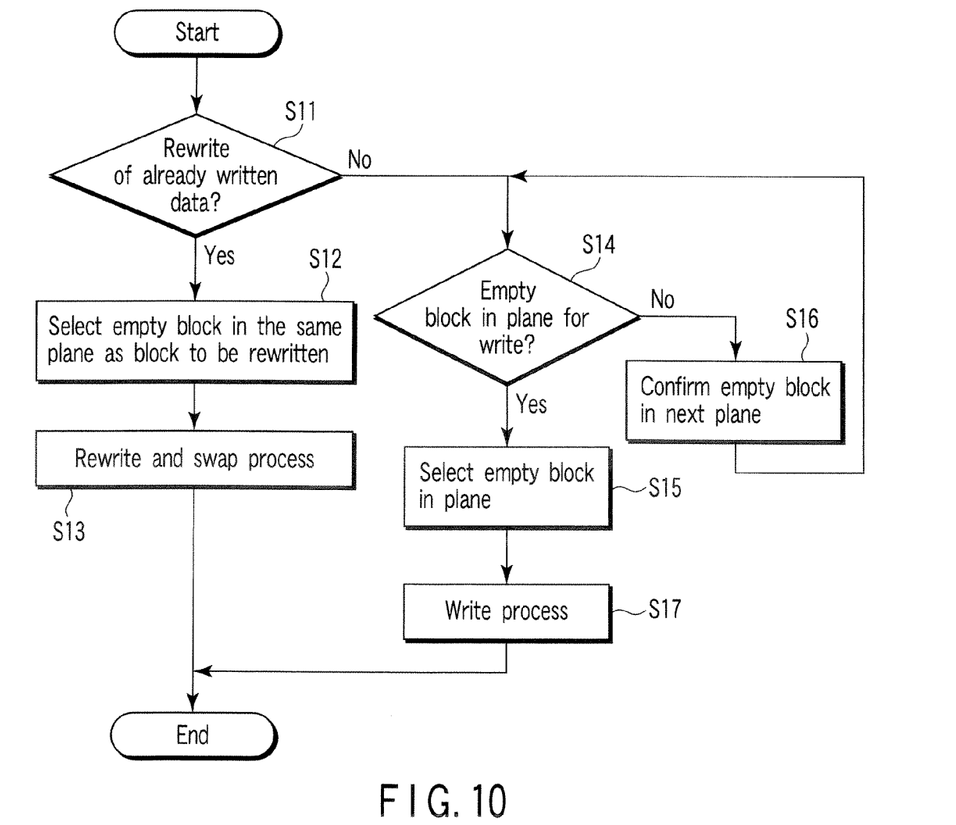
FIG. 10 is a flow chart illustrating an example of a write operation relating to the first embodiment.

FIG. 10 illustrates an example of the write operation relating to the first embodiment. The write operation is described with reference to FIG. 10.

To start with, it is determined whether the write operation is a rewrite operation of already written data (S11). If data which is already written in the memory area 3-1 is to be updated, an empty block in the associated plane is selected (S12). Using the selected block, a data rewrite operation and a swap process are executed (S13). Specifically, new update data is written in a new block which is an erased block. From the old block including old data to be updated, the other non-updated data is copied to the new block. The new block is selected from the blocks in the same plane as the old block. In this case, one block is used as the new block. After the swap operation, the old block is erased. Thus, the number of empty blocks in the memory area 3-1 (i.e. the number of written blocks) is unchanged.

On the other hand, in step S11, if new data, to which a block has not yet been assigned, is to be written, that is, if data cannot be additionally written in a block in which some data is already written, a new block is assigned as a block for storing the new data.

The assignment of the new block is executed as shown in steps S14 to S17.

To begin with, referring to the management table 4-1 shown in FIG. 9, it is determined whether an empty block is present in the plane for write. In this case, it is first determined whether an empty block is present in the plane P0 (S14). Specifically, it is determined whether the number NSB of empty blocks in the plane P0 reaches the lower-limit value "10". If the number NSB does not reach the lower-limit value and the plane P0 includes an empty block, a new block is assigned to the plane P0 (S15). If the plane P0 includes no empty block, that is, if the lower-limit value of the empty block number NSB reaches "10", it is similarly determined whether the second plane P1 includes an empty block (S16, S14). If the plane P1 includes an empty block, a new block is assigned to the plane P1 (S15). If the plane P1 includes no empty block, the third plane P2 and fourth plane P3 are successively searched for an empty block, and a detected empty block is assigned as a new block. In this manner, data is written in the assigned new block (S17). When the new block is assigned, the associated empty block number in the management table 4-1 is decremented.

According to the first embodiment, the lower-limit value of the empty block area SB for storing data is set in each plane. In each plane, 10 empty blocks are equally secured. Thus, in each plane, it is possible to prevent the number of empty blocks from decreasing to zero. Since the absence of an empty block, which is a destination of copy, can be avoided in each plane, a high-speed write operation can be executed by using the copy function.

In addition, in the case where the probability of subsequent occurrence of a defective block is equal in each plane, the probability of subsequent occurrence of a defective block in the equally set 10 blocks is also equal. Therefore, the copy function can be used for a long time, and a decrease in write speed can be suppressed.

In the first embodiment, the lower-limit value of the number of empty blocks in each plane is equally set. However, if the probability of occurrence of defective blocks varies from plane to plane, it is possible to vary the lower-limit value of the number of empty blocks in accordance with the probability of occurrence of defective blocks. For example, in a plane with a high probability of occurrence of a defective block, a higher lower-limit value may be set than in a plane with a low probability of occurrence of a defective block, and a greater number of empty blocks may be set in the plane with the high probability of occurrence of a defective block. If the number of empty blocks is set in this manner, the copy operation can be maintained for a long time, and a decrease in write speed can be prevented.

Second Embodiment

In the first embodiment, the lower-limit value is set to the number of empty blocks in each plane and an equal number of empty blocks are set in each plane, and data is successively written from plane P0 to plane P4.

By contrast, in a second embodiment of the invention, the lower-limit value is not set to the number of empty blocks in each plane, and new data write, and not additional data write, is executed by selecting a plane with a greatest number of empty blocks. In other words, a plane having a least total number of written blocks and defective blocks is selected, a block is assigned from this plane.

Figure 11:
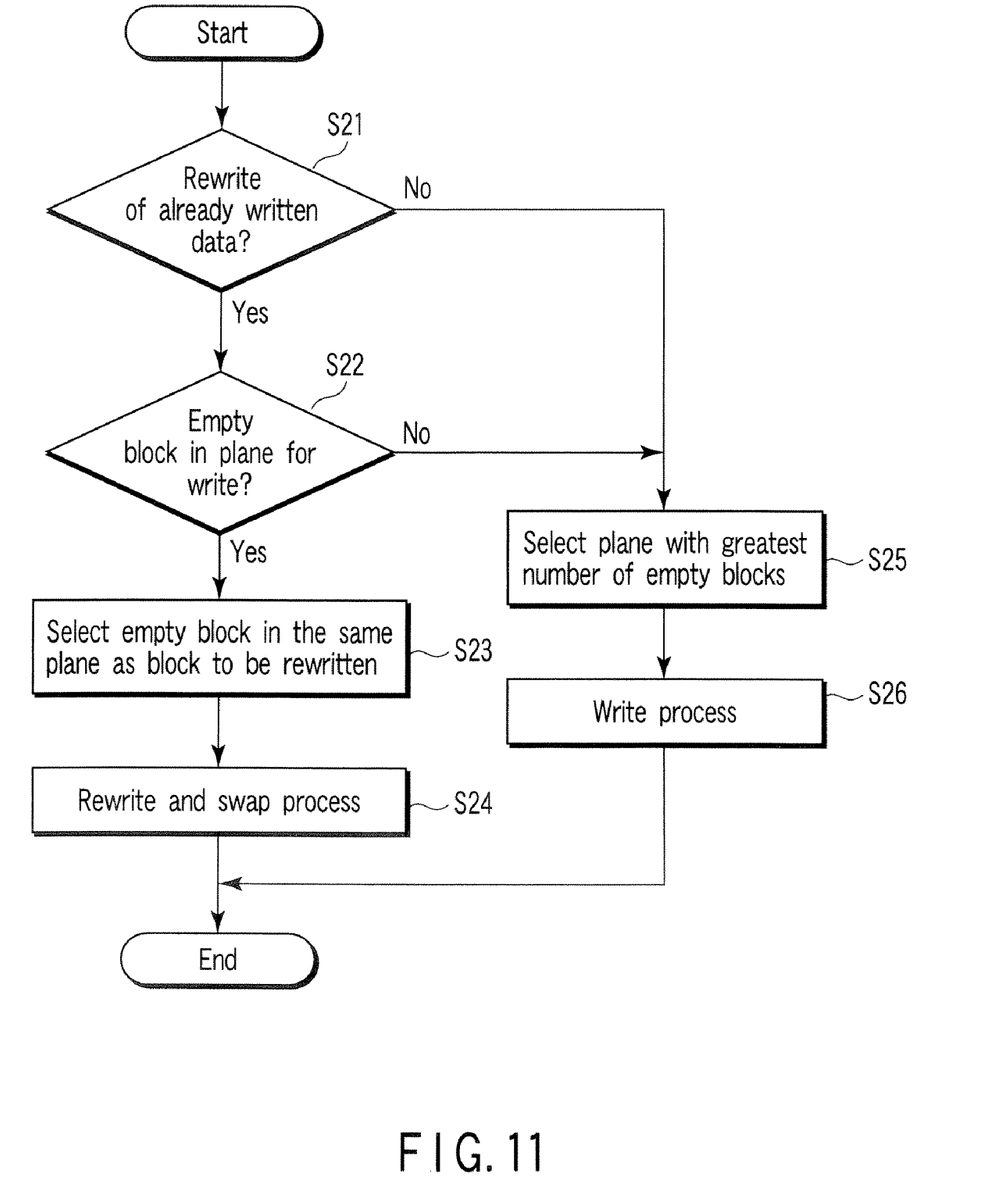
FIG. 11 is a flow chart illustrating an example of a write operation relating to a second embodiment.

FIG. 11 shows an example of the write operation relating to the second embodiment. To start with, the controller 4 determines whether the write operation is a rewrite operation of already written data (S21). If already written data is to be rewritten, it is determined whether an empty block is present in the plane for write (S22). If there is an empty block, the same plane as the data to be rewritten is selected as a destination of copy (S23). In this plane, a data rewrite operation and a swap process of already written data are executed (S24).

On the other hand, if new data write is determined in step S21 and if the absence of an empty block in the plane for write is determined in step S22, a plane with a greatest number of empty blocks is selected (S25). Specifically, referring to the management table 4-1 shown in FIG. 9, a plane with the greatest number NSB of empty blocks is selected (S25), and a write process is executed (S26). For example, in the initial state, the plane that meets this condition is plane P0. Thus, data is written in plane P0. If data is written in 11 blocks in the plane P0, the number NSB0 of empty blocks is "1009", and the plane P1 has a greater number of empty blocks. Accordingly, the plane P1 is selected and a block in the plane P1 is assigned as a new block, and data is written in the new block.

According to the second embodiment, when new data is to be written, a plane with a greater number of empty blocks is preferentially selected and data write is executed. Thereby, the number of empty blocks in each plane can be made uniform, and the absence of an empty block in a specific plane can be avoided. Therefore, the period of use of the copy function can be extended, and the high-speed write operation can be maintained.

In the first and second embodiments, the memory card has been described by way of example. However, needless to say, the present invention is not limited to the memory card and is applicable to other systems using semiconductor memory devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of controlling a semiconductor memory device, comprising:
    writing data, which is transferred from a first data cache and stored in a first page buffer, to a first memory area, the first memory area including a plurality of blocks, each of the blocks including a plurality of pages;
    writing data, which is transferred from a second data cache and stored in a second page buffer, to a second memory area, the second memory area including a plurality of blocks, each of the blocks including a plurality of pages;
    when new data is input, judging whether the number of empty blocks in the first memory area, in which the new data is to be written, reaches a first lower-limit value;
    when a number of empty blocks in the first memory area reaches the first lower-limit value, judging whether a number of empty blocks in the second memory area reaches a second lower-limit value; and
    when the number of empty blocks in the second memory area does not reach the second lower-limit value, selecting an empty block in the second memory area and writing new data in the second data cache.

2. The method according to claim 1, further comprising:
    setting the first lower-limit value and the second lower-limit value at an equal value in a case where a probability of occurrence of a defective block is equal in the first and second memory areas.

3. The method according to claim 1, further comprising:
    setting the first lower-limit value at a higher value than the second lower-limit value in a case where a probability of occurrence of a defective block in the first memory area is higher than that in the second memory area.

4. The method according to claim 1, further comprising:
    managing the number of empty blocks and a number of initial defective blocks in each of the first and second memory areas.

5. The method according to claim 1, wherein
    writing data to the first memory area includes executing data write from the first page buffer to the first memory area and data transfer of the first data cache in parallel, and
    writing data to the second memory area includes executing data write from the second page buffer to the second memory area and data transfer of the second data cache in parallel.

6. The method according to claim 1, wherein
    writing in the first and second memory areas includes inputting data to a flash memory that includes the first and second memory areas.

7. The method according to claim 1, further comprising:
    when superseding data in the first memory area is input, selecting an empty block in the first memory area and writing data to the first data cache; and
    when superseding data in the second memory area is input, selecting an empty block in the second memory area and writing data in the second data cache.

8. A method of controlling a semiconductor memory device, comprising:
    writing data, which is transferred from a first data cache and stored in a first page buffer, to a first memory area, the first memory area including a plurality of blocks, each of the blocks including a plurality of pages;
    writing data, which is transferred from a second data cache and stored in a second page buffer, to a second memory area, the second memory area including a plurality of blocks, each of the blocks including a plurality of pages;
    when superseding data in the first memory area is input, selecting an empty block in the first memory area and writing data to the first data cache;
    when superseding data in the second memory area is input, selecting an empty block in the second memory area and writing data in the second data cache;
    when new data is input, selecting one of the first and second memory areas with a greatest number of empty blocks;

when the first memory area is selected, writing the new data to the first data cache; and when the second memory area is selected, writing the new data to the second data cache.

9. The method according to claim 8, further comprising:

managing the number of empty blocks and a number of initial defective blocks in each of the first and second memory areas.

10. The method according to claim 9, wherein the selecting includes selecting one of the first and second memory areas with a least number of written blocks and initial defective blocks.

11. The method according to claim 8, wherein writing in the first and second memory areas includes inputting data to a flash memory that includes the first and second memory areas.

12. A semiconductor memory device comprising:

a first memory area including a first data cache, a first page buffer, and a plurality of blocks, each of the blocks including a plurality of pages;

a second memory area including a second data cache, a second page buffer, and a plurality of blocks, each of the blocks including a plurality of pages; and a control unit configured to when new data is input, judge whether the number of empty blocks in the first memory area, in which the new data is to be written, reaches a first lower-limit value, when a number of empty blocks in the first memory area reaches the first lower-limit value, judge whether the number of empty blocks in the second memory area reaches a second lower-limit value, and when the number of empty blocks in the second memory area does not reach the second lower-limit value, select an empty block in the second memory area and write new data in the second data cache.

13. The device according to claim 12, wherein the first lower-limit value and the second lower-limit value are set at an equal value in a ease where a probability of occurrence of a defective block is equal in the first and second memory areas.

14. The device according to claim 12, wherein the first lower-limit value is set at a higher value than the second lower-limit value in a case where a probability of occurrence of a defective block in the first memory area is higher than that in the second memory area.

15. The device according to claim 12, wherein the control unit manages the number of empty blocks and a number of initial defective blocks in each of the first and second memory areas.

16. The device according to claim 12, wherein the control unit is further configured to execute data write from the first page buffer to the first memory area and data transfer of the first data cache in parallel, and execute data write from the second page buffer to the second memory area and data transfer of the second data cache in parallel.

* * * * *